United States Patent
Seidel et al.

(10) Patent No.: US 6,627,898 B2
(45) Date of Patent: Sep. 30, 2003

(54) METHOD AND SYSTEM FOR MONITORING RADIATION AND REJECTING NOISE

(75) Inventors: John G. Seidel, Pittsburgh, PA (US); Francis H. Ruddy, Monroeville, PA (US); Abdul R. Dulloo, Pittsburgh, PA (US); Thomas V. Congedo, Pittsburg, PA (US)

(73) Assignee: Westinghouse Electric Company LLC, Pittsburgh, PA (US)

(*) Notice: Subject to any disclaimer, the term of this patent is extended or adjusted under 35 U.S.C. 154(b) by 281 days.

(21) Appl. No.: 09/891,781

(22) Filed: Jun. 26, 2001

(65) Prior Publication Data

US 2002/0195569 A1 Dec. 26, 2002

(51) Int. Cl.[7] .................................................. G01T 3/08
(52) U.S. Cl. .............................. 250/390.01; 250/390.11
(58) Field of Search ...................... 250/339.02, 370.05, 250/370.06, 370.13, 363.09, 369, 360.1, 358.1, 342, 390.01, 390.11, 390.04, 390.07

(56) References Cited

U.S. PATENT DOCUMENTS 4,088,907 A * 5/1978 Jones et al. ................. 310/333
4,160,386 A * 7/1979 Jackson et al. ................ 73/625
4,945,239 A * 7/1990 Wist et al. ................ 250/358.1
5,150,714 A * 9/1992 Green .................... 128/660.06
5,969,359 A   10/1999 Ruddy et al.
6,310,349 B1 * 10/2001 Wong et al. ........... 250/363.09

* cited by examiner

*Primary Examiner*—Constantine Hannaher
*Assistant Examiner*—Otilia Gabor (57) ABSTRACT

A method of monitoring a nuclear reactor includes monitoring the nuclear reactor with a plurality of radiation sensors having spaced apart attachments to a radiation hard cable; providing signal processing equipment at each end of the cable for processing signals from the radiation sensors; establishing signal time intervals based upon differences in time of arrival of signals from the radiation sensors to the signal processing equipment at each end of the cable; producing a plurality of output signals each of which has an amplitude proportional to a difference in time of arrival of a signal to the signal processing equipment at each end of the cable; and rejecting output signals which have a difference in time of arrival outside of the signal time intervals.

26 Claims, 6 Drawing Sheets

METHOD AND SYSTEM FOR MONITORING RADIATION AND REJECTING NOISE

CROSS-REFERENCE TO RELATED APPLICATION

This application is related to commonly owned U.S. patent application Ser. No. 09/629,286, filed Jul. 31, 2000.

BACKGROUND OF THE INVENTION

1. Field of the Invention

The present invention relates to methods and systems for monitoring radiation, such as, for example, neutron and gamma emissions of a nuclear reactor or from spent nuclear fuel. The invention also relates to methods for monitoring a nuclear reactor. The invention further relates to methods for rejecting noise and accepting signals from a communication channel.

2. Background Information

Every circuit that is employed to detect relatively small electrical signals, such as pulses, must inevitably face the problem of separating the desired signal from unwanted noise. The sources of noise can be numerous, with the solution often being elusive. Properly shielded and grounded signal cables are typically employed to isolate signals from noise sources, although such cables, alone, are often insufficient.

In the nuclear industry, for example, special radiation hard cable is frequently employed to send signals from radiation monitors back to associated electronics that amplify and monitor those signals. Quartz is a common insulating material employed in such cables because of its radiation resistance and low dielectric absorption to signals having relatively fast transitions. However, quartz is susceptible to noise generated by both piezoelectric and triboelectric effects. For example, flexing or vibrating the cable can produce voltages within the cable at the point of the movement. These unwanted voltage signals, in turn, appear at the associated electronics. Often, a circuit can separate out the noise based upon pulse height or pulse shape. However, if the noise pulse happens to mimic a radiation monitor signal, then it is falsely counted as such a signal.

Application Ser. No. 09/629,286 discloses a method and system, which identify the source of a signal from multiple detector sources. The time differential of two arriving signals is employed to distinguish those arriving signals from signals from other detectors, which are also connected to the same communication channel or cable. That method and system, however, are susceptible to spurious noise signals.

Accordingly, there is room for improvement.

SUMMARY OF THE INVENTION

The present invention has been developed in view of the foregoing and other deficiencies of the prior art. The invention employs the arrival time of detector signals on a cable as a way to determine which detector has produced a signal and, also, to reject pulses originating along the cable at points other than at the detectors.

Signal-monitoring equipment is employed at each end of a cable to which plural detectors are electrically connected. Each detector is at a unique differential distance from each of the two sets of equipment. For example, if four detectors are each connected to the cable, then the difference in cable length between any detector and each of the two sets of equipment is unique. As a further example, a first detector might be closest to a first preamplifier and furthest from a second preamplifier, while the opposite is true for the fourth detector. Hence, the time difference between signal detection at each preamplifier is unique for each detector location.

As one aspect of the invention, a method of monitoring a nuclear reactor comprises: monitoring the nuclear reactor with a plurality of radiation sensors having spaced apart attachments to a cable; providing signal processing equipment at each end of the cable for processing signals from the radiation sensors; establishing signal time intervals based upon differences in time of arrival of signals from the radiation sensors to the signal processing equipment at each end of the cable; producing a plurality of output signals each of which has an amplitude proportional to a difference in time of arrival of a signal to the signal processing equipment at each end of the cable; and rejecting output signals which have a difference in time of arrival outside of the signal time intervals.

As another aspect of the invention, a method of monitoring a nuclear reactor comprises: providing a plurality of radiation sensors having spaced apart electrical connections to a communication channel; providing signal processing equipment at each end of the communication channel to process signals from the radiation sensors; establishing a difference in time of arrival for signals from each of the radiation sensors to the signal processing equipment at each end of the communication channel; establishing a signal time interval for each of the differences in time of arrival; producing a plurality of output signals each of which is related to a difference between time of arrival of a signal at the signal processing equipment at each end of the communication channel; rejecting the output signals which have the difference between time of arrival outside of the signal time intervals; and employing the output signals which have the difference between time of arrival within one of the signal time intervals to monitor the nuclear reactor.

Preferably, the method includes producing the output signals having an amplitude proportional to the difference between time of arrival.

As a further aspect of the invention, a system for monitoring radiation comprises: a communication channel having two ends; a plurality of radiation sensors having spaced apart electrical connections to the communication channel; signal processing equipment at each of the ends of the communication channel to process signals from the radiation sensors; means for producing a plurality of output signals related to a difference between time of arrival of a signal at the signal processing equipment at each of the ends of the communication channel; means for rejecting the output signals which have the difference between time of arrival outside of a predetermined signal time interval for each of the radiation sensors; and means for monitoring radiation based upon the output signals which have the difference between time of arrival within one of the predetermined signal time intervals.

The means for producing may include timing analyzer means for measuring the difference between time of arrival.

As another aspect of the invention, a method of rejecting noise and accepting signals from a communication channel comprises: providing a plurality of sensors having spaced apart electrical connections to the communication channel; providing signal processing equipment at each end of the communication channel to process signals from the sensors; establishing a difference in time of arrival for signals from each of the sensors to the signal processing equipment at each end of the communication channel; establishing a signal time interval for each of the differences in time of arrival; producing a plurality of output signals each of which is related to a difference between time of arrival of a signal at the signal processing equipment at each end of the communication channel; rejecting the output signals which have the difference between time of arrival outside of the signal time intervals; and accepting the output signals which have the difference between time of arrival within one of the signal time intervals.

Preferably, the method includes employing a plurality of unique differences in time of arrival; and employing an acceptance window about each of the unique differences to form the signal time intervals.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
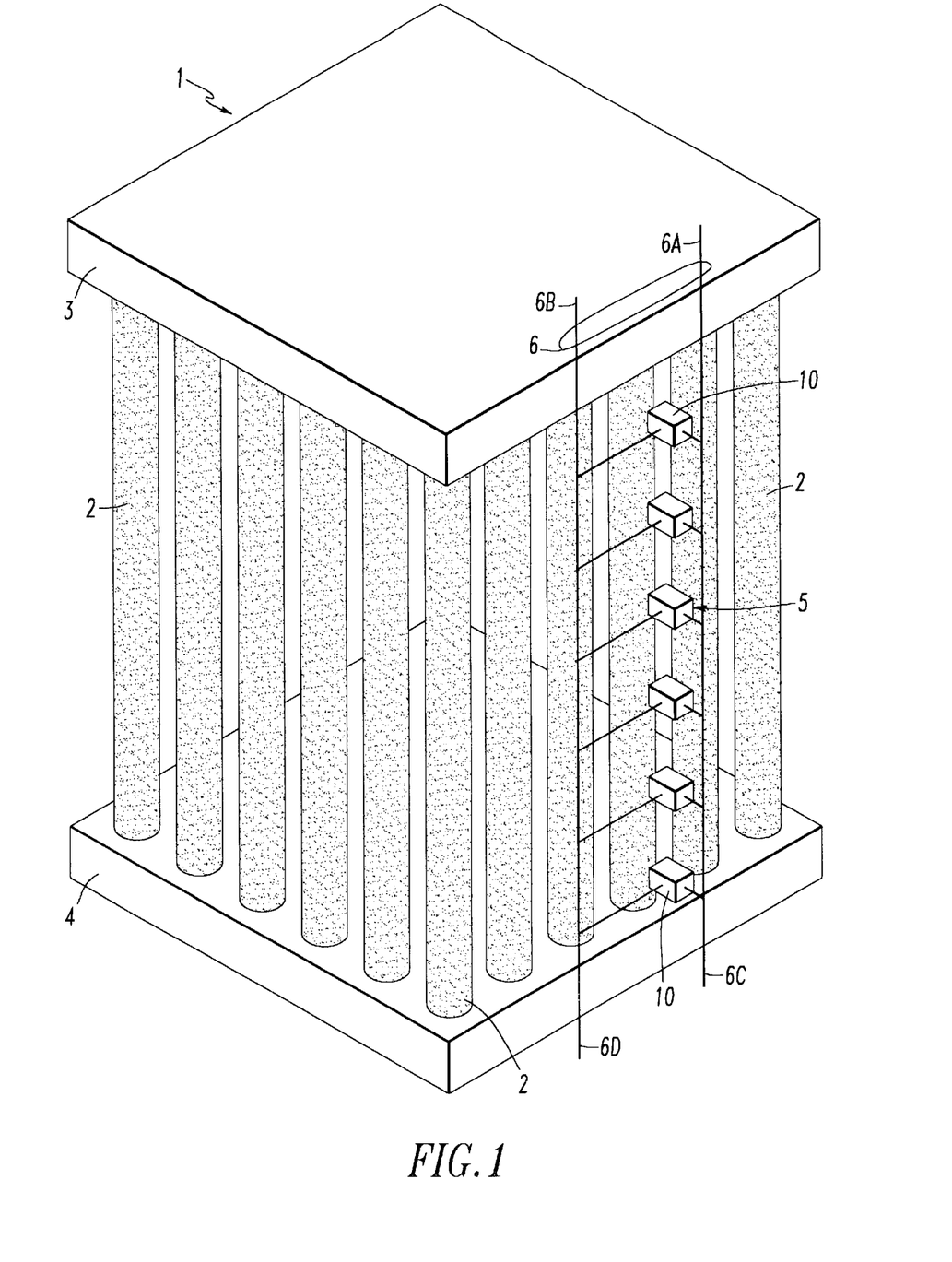
FIG. 1 is a partially schematic view of a neutron and gamma radiation detector string positioned adjacent nuclear fuel assemblies in accordance with an embodiment of the present invention.

FIG. 1 schematically illustrates the placement of an exemplary neutron and gamma semiconductor detector array adjacent to nuclear fuel. An exemplary system 1 is provided for measuring neutron and gamma emissions from nuclear fuel, although the invention is applicable to a wide range of methods or systems for monitoring radiation or rejecting noise.

As employed herein, the term "neutron emissions" means production of neutrons either by fission of reactor fuel or by spontaneous fission (e.g., $^{244}Cm$ decay and ($\alpha$,n) reactions as a secondary result of $\alpha$-decay of actinide isotopes in irradiated reactor fuel).

As employed herein, the term "gamma emissions" means production of gamma rays as an accompaniment to nuclear fission or spontaneous alpha and beta decay of radioactive isotopes.

For the exemplary system 1, nuclear fuel is typically provided in the form of at least one fuel assembly 2 secured by a top plate 3 and a bottom plate 4. The fuel assemblies 2 are, thus, provided in the form of a rack. In the embodiment shown in FIG. 1, an array 5 of exemplary semiconductor detectors 10 is provided in a string outside (or remote from) the rack of fuel assemblies 2 of a reactor pressure vessel (not shown). A suitable communication channel 6, such as a coaxial cable, is provided to transfer electronic signals generated by the semiconductor detectors 10. The coaxial cable 6 has two ends, each of which has a first (center) conductor 6A,6C and a second (shield) conductor 6B,6D, with 6A,6B being at one end of the cable 6 and 6C,6D being at the other end. The exemplary array 5 of semiconductor detectors 10 extends along at least the substantial axial length of the fuel assemblies 2. This arrangement permits radiation, such as neutron and gamma emissions, to be sensed at different axial locations along the fuel assemblies 2, and also permits the determination of the axial burnup profile of the fuel assemblies 2.

Figure 2:
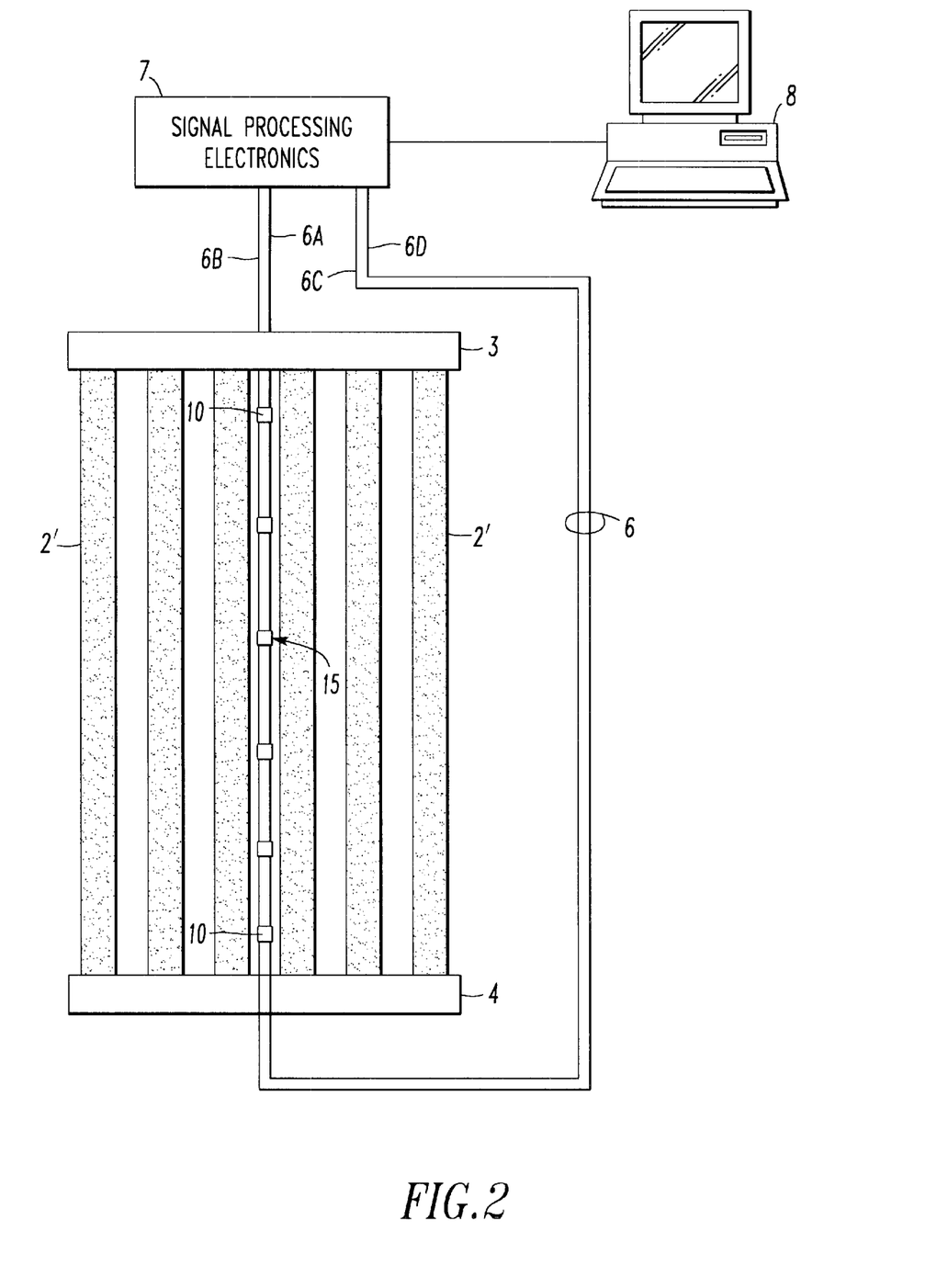
FIG. 2 is a partially schematic view of a neutron and gamma radiation detector string positioned within a rack of spent nuclear fuel assemblies in accordance with another embodiment of the present invention.

FIG. 2 schematically illustrates an exemplary semiconductor neutron and gamma detector array 15 positioned within a rack of spent fuel assemblies 2' in accordance with another embodiment of the present invention. This embodiment is similar to that shown in FIG. 1, except that the detector array 15 is located in the middle of the rack.

The detector arrays 5 and 15 of FIGS. 1 and 2, respectively, are connected by the exemplary coaxial cable 6 to signal processing electronics 7 as shown in FIG. 2. The exemplary signal processing electronics 7 processes voltage pulses produced by interaction of gamma rays and neutron-induced charged particles and electronically counts the pulses, although the invention is applicable to a wide range of detected signals. For example, the invention is applicable to any device that produces an electrical pulse (e.g., without limitation, vibration sensors, light sensing diodes, temperature sensing diodes, as well as a variety of neutron and gamma ray detectors including semiconductor detectors, gas-filled detectors, scintillators, and fiber optic devices). A suitable microprocessor 8 may be employed to store data and/or to generate a video display or a printout of the neutron and gamma ray measurements.

While six individual detectors 10 are shown in FIGS. 1 and 2, any suitable detector count may be employed in the arrays 5,15 along the axial length of the fuel assemblies 2,2'. Preferably, the detector arrays 5,15 include from two to about 100 individual semiconductor detectors, more preferably from about four to about 50 detectors. The spacing of the semiconductor detectors 10 may be varied depending on the radiation gradient of the fuel assemblies 2,2'. The spacing is chosen to give adequate information on the details of the shape of the axial gradient for a particular fuel type. For example, closer spacing would be used in arrays designed for boiling water reactor (BWR) fuel applications as opposed to pressurized water reactor (PWR) fuel where less severe gradients are encountered.

A typical design for a semiconductor burnup meter comprises a string of miniature SiC neutron/gamma detectors located at key axial locations along the fuel assemblies 2,2', over a length of up to about 150 inches, although the invention is applicable to a wide range of lengths and detector counts. These individual semiconductor detectors preferably simultaneously record neutron and gamma ray count rates.

The signal processing electronics 7 of FIG. 2 sends the count rates to the microprocessor 8 (e.g., a measurement control computer, workstation, laptop PC, other suitable processor). The exemplary microprocessor 8 preferably contains software to process the individual neutron and gamma ray count rates, to determine the shape of the burnup profile, and, by analysis of the profile shape, to accurately determine the total burnup of the fuel assemblies 2,2'. The axial burnup profile data may also be used to accurately determine the maximum burnup location on the fuel assemblies 2,2', if desired for spent fuel cask loading operations.

Each exemplary semiconductor detector 10 may preferably comprise a neutron converter layer and a semiconductor active region, which is designed to avoid radiation damage to the semiconductor material in the active region. Also, the type of neutron converter layer, the type of semiconductor material, and the thickness and placement of the semiconductor active region are preferably controlled to allow the charged particles to pass through the active semiconductor region without substantial displacement damage. The semiconductor active region is sufficiently thin to avoid displacement damage, but is thick enough to allow sufficient ionization or electron excitation to create a measurable electronic pulse.

Figure 3:
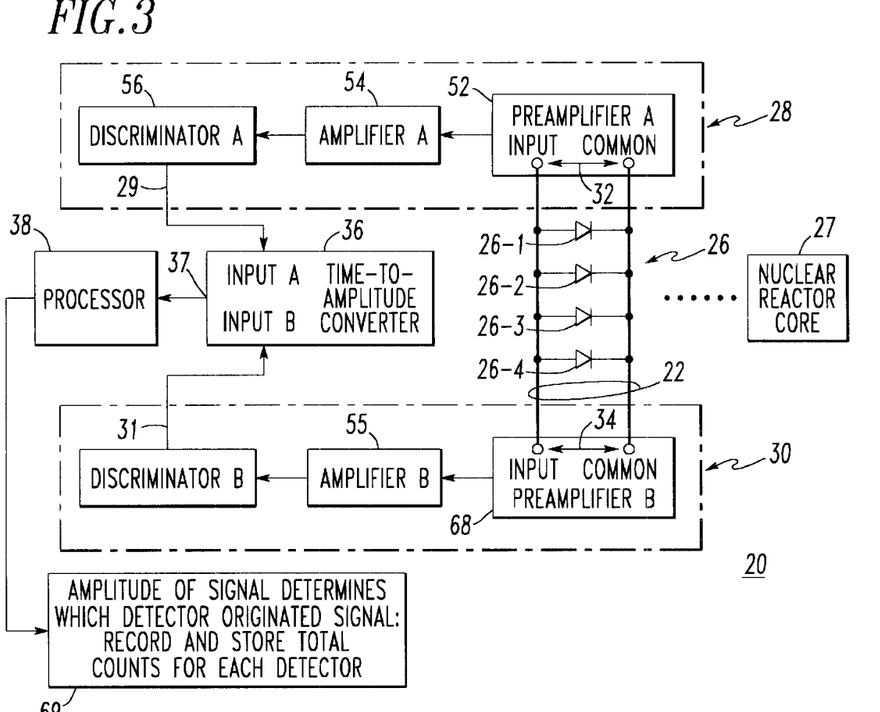
FIG. 3 is a block diagram of a radiation monitoring system in accordance with another embodiment of the present invention.

FIG. 3 shows a radiation monitoring system 20 including a suitable two-ended communication channel 22, and a plurality of detectors 26 for the exemplary nuclear reactor core 27. Each of the detectors 26 sources a signal to the communication channel 22. In the preferred embodiment, the detectors 26 are identical to the detectors 10 of FIGS. 1 and 2, although a wide range of detectors may be employed. A pair of receivers 28,30 receives and outputs, at 29,31, signals 32,34, respectively, from the communication channel 22. The communication channel 22 provides a unique predetermined differential delay for each of the detectors 26, with the signal 34 of a detector (e.g., 26-1) at the receiver 30 being delayed with respect to the signal 32 of such detector at the receiver 28 by a unique predetermined differential delay (e.g., Δ1) for such detector. Similarly, other unique predetermined differential delays (e.g., Δ2, Δ3, Δ4) are employed for the detectors 26-2,26-3,26-4.

A suitable timing analyzer 36 (e.g., without limitation, Canberra Time-to-Amplitude Converter/SCA, model 2145; Ortec Picosecond Time Analyzer, model 9308) measures the delay between the signals at outputs 29,31, which signals are received by the respective receivers 28,30 from the communication channel 22. For example, a time-to-amplitude converter measures the time between two events and outputs, at 37, a signal having a relative amplitude, which is proportional to this time difference.

If both neutron and gamma profiles are measured, then the signal is split at the output of the amplifier A 54 and the amplifier B 55. Duplicate circuits (not shown) are then employed following the amplifiers 54,55. One circuit has its discriminators set for gamma signals, while the other duplicate circuit is adjusted to detect neutrons. Each duplicate circuit, in turn, employs a time-to-amplitude converter and processor (not shown).

A suitable processor 38 (e.g., computer and software) groups and counts the various amplitude signals. Hence, this identifies, for example, detector 26-1 as being the source of the signal if the measured delay is sufficiently close to the predetermined delay Δ1, while detector 26-2 is the source of the signal if the measured delay is sufficiently close to the predetermined delay Δ2. The suitable processor 38 (or another processor (not shown)) may be employed for classifying, counting and storing the electronic signals (e.g., related to emissions) 32,34 from the detectors 26, and employing those signals for simultaneously mapping neutron and/or gamma profiles.

As shown in FIG. 3, the first receiver 28 receives the signal 32 from one end of the communication channel 22, and the second receiver 30 receives the signal 34 from the other end of the communication channel 22. The exemplary system 20 employs timing analysis of the signals 32,34 arriving at the respective receivers 28,30. Although an exemplary system configuration is shown in FIG. 3, the specific configuration, and length or time differences between the detectors 26 and the receivers 28,30 may be modified to reflect the actual count of detectors 26 and/or the expected rate of exemplary neutron and gamma emissions for each of those detectors 26.

Continuing to refer to FIG. 3, each of the exemplary receivers 28,30 includes (as shown with receiver 28) a preamplifier 52, an amplifier 54 and a discriminator 56. The preamplifier 52 and amplifier 54 provide suitable amplification of the signal 32 from the communication channel 22. The function of the discriminator 56 is to accept incoming signals that are above a preset voltage or fall within a set voltage range. In addition, the discriminator 56 provides an output pulse for each initially accepted input signal. This output pulse has the same shape and amplitude regardless of the input signal. The timing analyzer 36 produces the signal at output 37, which signal has an amplitude that is dependent on the time difference in the arrival of the signals 32,34 at the two preamplifiers 52 and 68. As further discussed below in connection with FIG. 5, since the amplitude of the signal of the timing analyzer output 37 depends on the detector 26 from which that signal originated, the processor 38 sorts the various amplitude signals and either adds a count for the appropriate detector when the amplitude of that signal suitably corresponds to one of the possible delay time windows or intervals 74,76,78,80 of FIG. 5 or, else, rejects certain amplitude signals which do not correspond to any of the possible delay time windows.

Most time analyzers, for example, are flexible in regard to the time span. For instance, the exemplary Ortec 9308 time analyzer can operate over 12 ranges, which span from 80 ns to 163 μs by dividing the time period into 65536 bins. So, for an 80 ns span, each time increment is 1.2 ps. For a 163 μs span, each increment is 2.5 ns. As a further example, the exemplary Canberra 2145 time-to-amplitude converter/SCA has 15 range settings from 20 ns to 1 ms. The shortest time increment that can be measured is 5 ns to 100 ns on the longest time range. In these examples, there is considerable flexibility in both the time range and the resolution of the time increments.

An exemplary 1 ns time difference may readily be resolved if the signal of the discriminator output 29 is suitably narrow and has a sufficiently sharp rise time. Although an incremental time difference of 1 ns is disclosed, the invention is applicable to a wide range of incremental time differences, detector counts, and predetermined delay window time widths and counts.

In order for the exemplary system 20 to be effective, the period between the two timed events for the signals 32,34 should not see another signal. This means that as the count rate increases, so does the possibility of errors due to other events occurring during this period. To keep this type of error sufficiently small, the maximum timed period should preferably be set to be relatively short with respect to the average period of the events. For example, if the longest time between the timed events is 10 ns, and if the average period of the incoming signals is desired to be 100 times longer, then the highest count rate would have a period of 1 µs (=100×10 ns) for a count rate of 1 Mcps. The exemplary Ortec 9308 time analyzer operates at an average rate of 2 Mcps.

Figure 4:
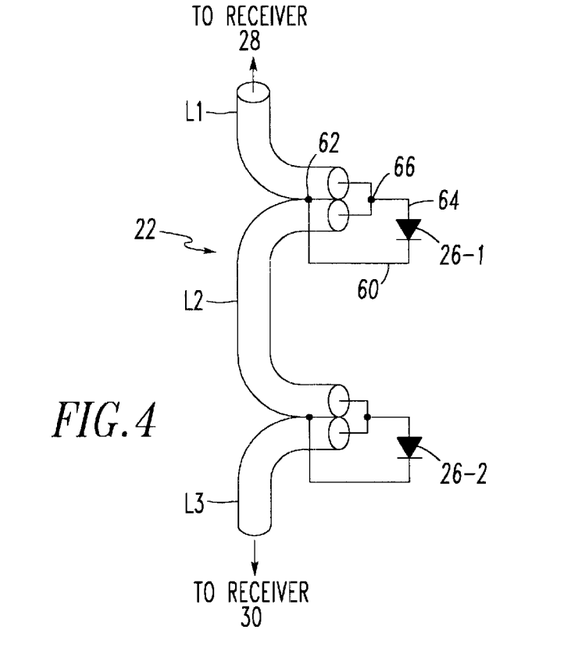
FIG. 4 is a block diagram of the communication cable for the system of FIG. 3.

An example of the communication channel 22 is shown in FIG. 4. For the first three detectors 26-1,26-2,26-3 (only two detectors are shown in FIG. 4), the communication channel 22 has a length (e.g., L1) between the first receiver 28 and the first detector 26-1, a length (e.g., L2) between the first detector 26-1 and the second detector 26-2, and a length (e.g., L3) between the second detector 26-2 and the third detector 26-3 of FIG. 3. In this example, the communication channel 22 is formed from an environmentally rugged cable (e.g., without limitation, coaxial quartz insulated cable marketed by Image & Sensing Corp.; Habiatron Cable marketed by Habia Cable Co.). Preferably, constant lengths L1,L2,L3 are employed in order to simplify the determination of the time differences, although the invention is applicable to delays provided by a wide range of different cable lengths.

In the examples shown in FIGS. 3 and 4, the exemplary detectors 26 produce a voltage which is transferred to the exemplary "radiation hard" coaxial cable 22. In these examples, the common lead 60 is connected to the shield 62 while the signal wire 64 is connected to the center conductor 66 of the coaxial cable 22.

As shown in FIG. 3, if the detector 26-1 (shown as an exemplary diode) develops a voltage across it, then this voltage (signal 32) will be detected at preamplifier (A) 52 sooner than the voltage (signal 34) which is detected at preamplifier (B) 68. This is due to the exemplary longer distance, which is between detector 26-1 and preamplifier (B) 68, than the relatively shorter distance, which is between detector 26-1 and preamplifier (A) 52. The opposite is true for detector 26-4, which is closer to the preamplifier (B) 68 than it is to the preamplifier (A) 52. The differential distance from each detector 26 to each of the preamplifiers 52,68 is unique, therefore, the time differential between the arrival of the signals 32,34 at the respective preamplifiers 52,68 is unique for each detector 26.

For example, SiC sensors can detect both gamma and neutron events. The detector output signal, however, is higher in amplitude for the neutron events. The discriminator 56 can be set to accept the appropriate range of amplitudes. Therefore, the discriminator setting determines whether gamma rays, neutrons, or both are being counted. The total counts per second that the timing analyzer 36 handles depends on the speed of the analyzer itself, the count of detectors 26, and the incremental time separation of the signals 32,34.

The exemplary system 20 employs amplification followed by processing of timed events in order to classify and count the events from each of the detectors 26. The processing phase is accomplished by the exemplary timing analyzer 36, which determines the time difference between two incoming signals from the discriminator outputs 29,31, and produces a pulse at output 37 having an amplitude that is proportional to this time difference. The processor 38 employs a suitable routine 69 to register this pulse signal and add it to the total count of events that occurred with a corresponding delay time interval difference. A histogram (not shown) of the count of events for each time difference is displayed. In accordance with the present invention, regions of interest, such as the exemplary delay time windows 74,76,78,80 of FIG. 5, are set at the time differences that match the signal arrival times from the various detectors 26.

The exemplary timing analyzer 36 may be replaced by circuits that are more conventional. For instance, coincidence electronics (not shown) may be used. An appropriate delay may be added to one of the two inputs in order that each of the two signals from a detector 26 arrive at the coincidence electronics at the same instant. The disadvantage of this type of circuit is that a separate coincidence and counting circuit is employed for each desired time difference. This may be costly if several or more detectors 26 are employed. Furthermore, it makes the system less flexible since a hard-wired change is employed to select a different time difference.

Figure 5:
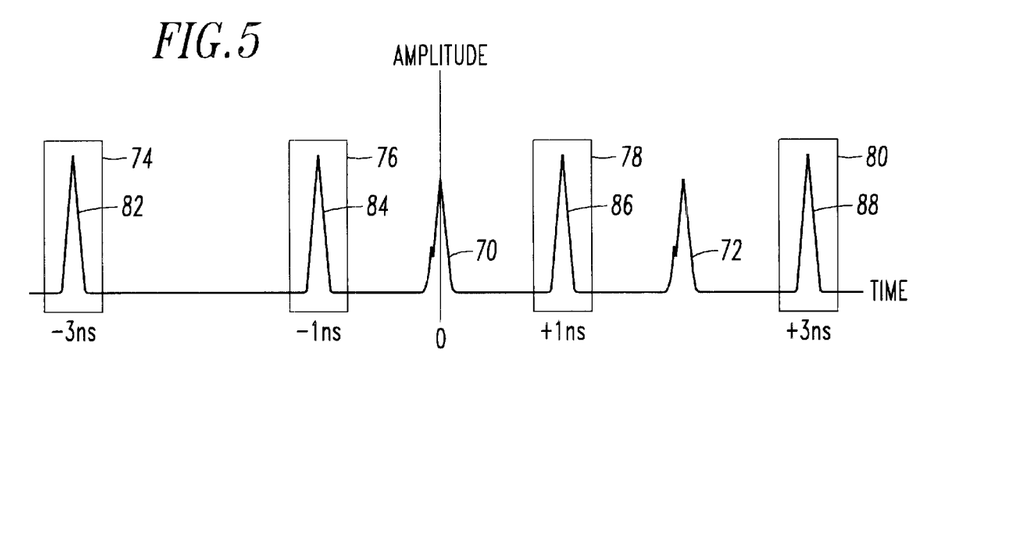
FIG. 5 is a plot showing the time differences between arriving pulses for the detectors of FIG. 3 along with noise pulses which originate at points other than at those detectors.

FIG. 5 shows the time separations for signals from the four detectors 26 of FIG. 3, if the distance of each line segment between adjacent detectors 26 is, for example, one foot, and the distance from the preamplifiers 52,68 to the adjacent detector 26-1,26-4, respectively, is, for example, two feet. In this example, if the signal originated from the detector 26-1, then the signal travels two feet to preamplifier A 52 and five feet to preamplifier B 68. This produces a difference of about 3 to 5 ns (the signal time at B less the signal time at A) in the arrival times, since the speed of an electromagnetic signal propagating along a cable is approximately 0.6 to 1 ft./ns, depending upon cable type. Assuming an exemplary propagation velocity of 1 ft./ns, as is the case for cables with air or vacuum as the dielectric, a time window 80 set at +3 ns registers the signal as a count from detector 26-1 since it is the only detector that could produce that time difference. Detector 26-4 also sees a 3 ns separation, but the difference is −3 ns since the signal reaches preamplifier B 68 before preamplifier A 52. Hence, the exemplary timing data shown in FIG. 5 provides a method of collecting and segregating the signals according to the detector which produced them, while employing a single common cable 22.

It will be appreciated that a wide variation of the cable lengths may be employed between the various adjacent detectors 26 and between the receivers 28,30 and those individual detectors 26. Any suitable approach, which provides a unique predetermined delay between the signals 32,34 for each of the detectors 26, may be employed.

Noise generated in the cable 22 may be rejected even if the noise signal resembles the signal of interest in pulse amplitude or shape. FIG. 5 shows two time difference output signals 70 and 72, resulting from two noise signals. The time difference signal 70 results from a signal produced along the cable 22 between detectors 26-2 and 26-3, and the time difference signal 72 results from a signal produced between detectors 26-1 and 26-2. The exemplary preset delay time windows 74,76,78,80 for the detectors 26-4,26-3,26-2,26-1 are centered about the exemplary times −3 ns, −1 ns, +1 ns, +3 ns, respectively. Since the arrival time difference (i.e., 0 ns and +2 ns) for the noise signals at the preamplifiers 52,68 does not match any of the preset delay time windows 74,76,78,80, both noise signals are rejected. On the other hand, since the preamplifier arrival time differences (i.e., −3 ns, −1 ns, +1 ns, +3 ns) for the detector signals 82,84,86,88 matches the respective preset delay time windows 74,76,78, 80, those four exemplary detector signals are accepted and counted.

For the timing analyzer 36, each of the signals at the outputs 29,31 is a relatively narrow TTL pulse from a corresponding single channel analyzer (SCA), such as the discriminator 56, with each pulse looking alike and only their arrival times being different. The timing analyzer 36 scales up a displayed dot for each channel, which dot represents the total count of events that have occurred at that time difference. Each channel represents a "window of time" that is the difference in arrival times of the signals 29,31. If all of these signals arrived with the same delay or time difference, then only a single channel would accumulate counts (e.g., one dot would move vertically up on the display) as these events occurred. If these channels or "time windows" are too narrow, then small variations in how a signal is interpreted by the SCA may cause a count to fall in an adjacent channel thus reducing the resolution of the timed measurement.

The variability in the time difference occurs when the SCA is triggered by signals having somewhat different rise times. Since signals above a certain threshold could be accepted by the SCA, often the rise time can vary with amplitude. For example, a very large signal tends to reach the discriminator's threshold setpoint faster than a signal that is just large enough to pass the threshold. Therefore, this slight time difference can produce some time variations that are a function of the signal's amplitude or shape. Preferably, Constant Fraction Discriminators, such as 56, are employed to eliminate this sort of timing error, although some variations in timing may still be present. The degree of timing error due to the signal shape and size determines the ultimate width of the time acceptance window set on the timing analyzer 36.

If the accepted delay time windows or intervals 74,76, 78,80 are relatively narrow, then any noise signal generated away from one of the detectors 26 arrives at the two preamplifiers 52,68 with a time difference that does not fit any of the preselected delay time differences and, therefore, is rejected. Thus, even if a noise pulse (at the signals 32,34) resembles an actual detector signal, this technique rejects the noise signal, thereby improving noise rejection.

Nuclear counting by a sensor array is one exemplary application for this noise reduction technique, although the present method provides noise rejection in other areas involving distributed sensors on a cable.

Figure 6:
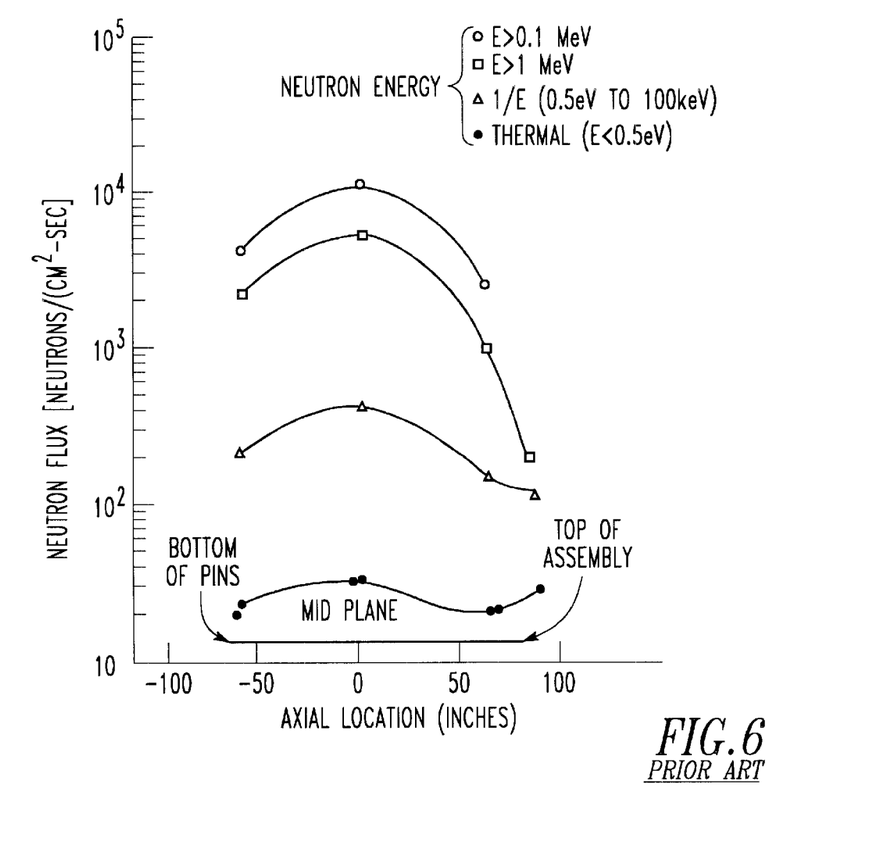
FIG. 6 is a graph showing axial neutron count rate distribution measured along the face of a spent nuclear fuel assembly.

FIG. 6 shows reported Solid State Track Recorder (SSTR) measurements of the neutron emission rate for spent fuel assemblies. These data were taken for a spent fuel assembly from a Pressurized Water Reactor (PWR) that had an average burnup of 25,665 Mwd/MTU and had been discharged approximately 2.7 years prior to the SSTR neutron measurements. It can be seen from the data presented in FIG. 6 that the fast neutron (En>1 MeV) emission rate has an axial profile which is closely related to the burnup profile for the spent fuel assembly.

Figure 7:
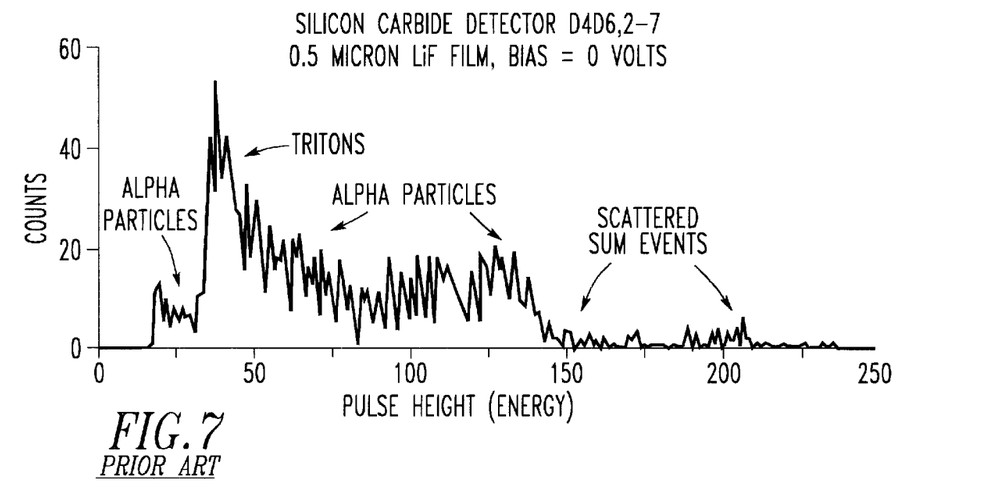
FIG. 7 is a graph showing the response of a semiconductor detector irradiated with neutrons.
Figure 8:
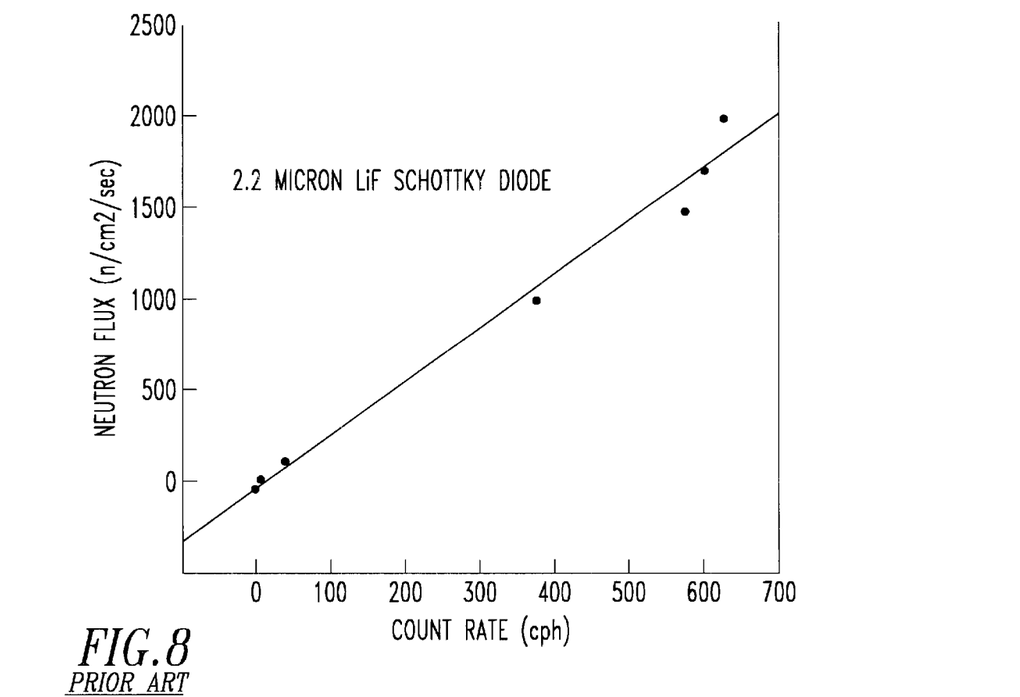
FIG. 8 is a graph showing thermal neutron flux as a function of neutron count rate for a semiconductor detector.

An example of a neutron-induced charged particle spectrum obtained with an exemplary SiC detector is shown in FIG. 7. In this case, a 400 $\mu$m diameter SiC Schottky diode equipped with a 0.5-$\mu$m thick $^6$LiF neutron converter layer was exposed to thermalized neutrons from a $^{252}$Cf isotopic source. The charged particle spectrum is produced by the energetic reaction products from the $^6$Li(n,$\alpha$)$^3$H reaction. The portions of the spectrum that correspond to the alpha particle ($^4$He) and triton ($^3$H) are identified in FIG. 7. Neutron detection using $Zr^{10}B^2$ and $^{235}$U converter layers was also demonstrated. In the case of $^6$LiF, a linear response to thermal neutron flux was demonstrated over three orders of magnitude in neutron flux, and these data are shown in FIG. 8.

Figure 9:
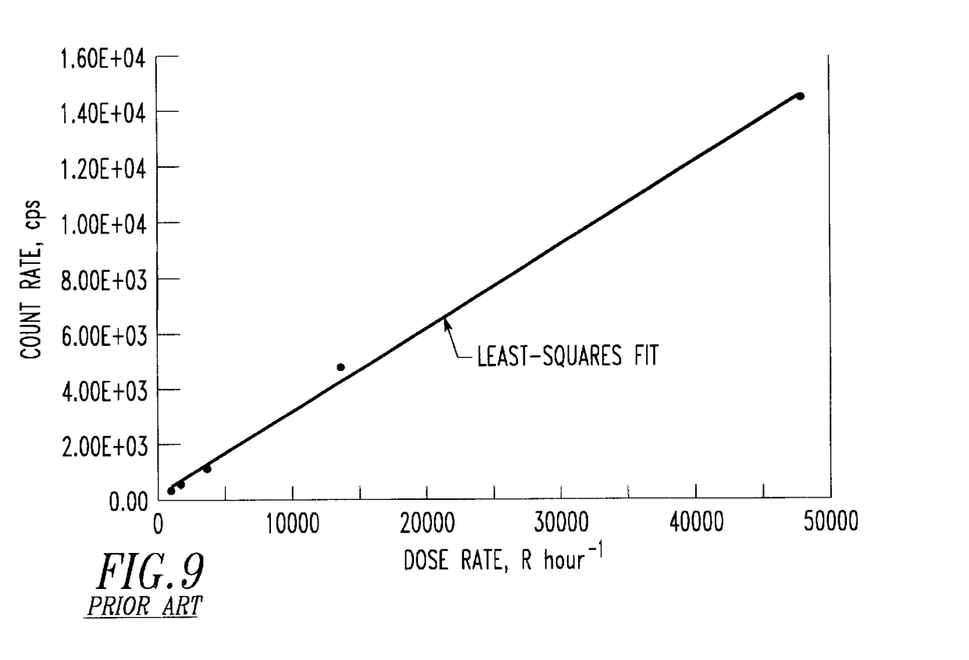
FIG. 9 is a graph showing gamma count rate as a function of gamma ray dose for a semiconductor detector.

FIG. 9 shows gamma count rate as a function of gamma ray dose for a semiconductor detector. The SiC detectors are employed in intense gamma ray fields using a gamma hot cell. For example, $^{60}$Co sources produce local gamma ray fields with known dose rates up to 50,000 R/hr. Preferably, a linear relationship between gamma-induced SiC count rate and gamma dose is provided.

A major advantage of the SiC neutron and gamma ray response is that the neutron- and gamma-induced pulses are completely separable on the basis of pulse height. The SiC sensors can detect both gamma rays and neutron events, with a converter layer being connected to the SiC to detect neutrons. The neutron events produce pulses larger than those being from gamma rays. The discriminator 56 may be used to select either the gamma or neutron events. This is done by adjusting the discriminator setting to accept the desired voltage pulses. The neutron-induced charged particle pulse height spectrum shown in FIG. 7 is typical for the $^6$Li case. The gamma ray induced signal is generally confined to much lower pulse heights than the neutron-induced charged particle spectrum.

Figure 10:
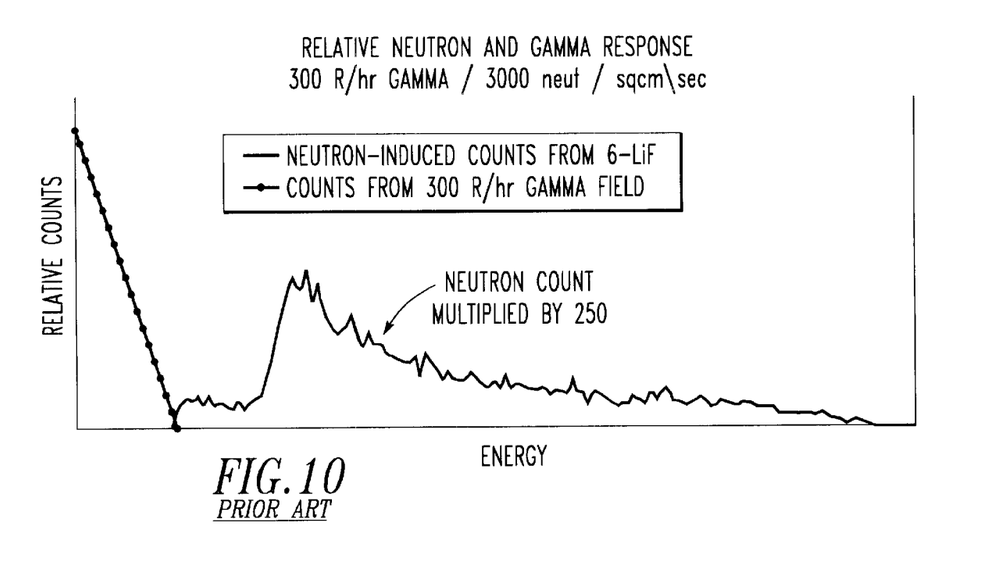
FIG. 10 is a graph showing a comparison of neutron-induced and gamma ray-induced signals in a semiconductor detector.

A combined gamma ray and neutron-induced pulse height spectrum is shown in FIG. 10. In this case, the response from a 300 R/hr gamma ray field is shown together with the response from a 3000 neutron/cm$^2$/second thermal neutron flux. FIG. 10 illustrates that gamma ray count rate (e.g., $^{137}$Cs) and neutron (e.g., $^{244}$Cm and $^{242}$Cm spontaneous fission) count rates can be determined simultaneously with a single SiC detector. The conventional Los Alamos Fork Detector, for example, requires a cadmium-covered $^{235}$U fission chamber to detect neutrons and a gamma ionization chamber to detect gross-gammas. Both of these large detectors could be replaced with a simpler, more compact, SiC detector, which is less sensitive to temperature and other environmental conditions in the measurement location. In addition, the SiC detector can provide neutron flux gradient data, which can define the assembly burnup, profile, and, thereby, improve the accuracy of burnup validation measurements.

The present invention provides a method for rejecting noise produced in signal cables even when noise pulse height and pulse shape discrimination are ineffective. This method also permits one or more detector devices to be connected to a single cable. This technique allows for the separation of a detector signal from noise pulses that may mimic the size and shape of a true signal. This technique aids in reducing noise problems now present in various nuclear monitoring systems. The disclosed method is readily implemented and may be employed in situations where discrimination of noise pulses by pulse height or pulse shape is ineffective. The invention is especially advantageous in applications which provide neutron and/or gamma profile mapping and, thus, which employ an array of radiation detectors or sensors in order to provide a count from each detector.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of monitoring a nuclear reactor, said method comprising the steps of:
    monitoring said nuclear reactor with a plurality of radiation sensors having spaced apart attachments to a cable;
    providing signal processing equipment at each end of the cable for processing signals from said radiation sensors;
    establishing signal time intervals based upon differences in time of arrival of signals from said radiation sensors to said signal processing equipment at each end of the cable;

producing a plurality of output signals each of which has an amplitude proportional to a difference in time of arrival of a signal to said signal processing equipment at each end of the cable; and rejecting output signals which have a difference in time of arrival outside of said signal time intervals.

2. The method of claim 1 further comprising:

employing silicon carbide sensors as said radiation sensors.

3. The method of claim 1 further comprising:

employing said radiation sensors to monitor a nuclear reactor core.

4. A method of monitoring a nuclear reactor, said method comprising the steps of:

providing a plurality of radiation sensors having spaced apart electrical connections to a communication channel;

providing signal processing equipment at each end of said communication channel to process signals from said radiation sensors;

establishing a difference in time of arrival for signals from each of said radiation sensors to said signal processing equipment at each end of said communication channel;

establishing a signal time interval for each of said differences in time of arrival;

producing a plurality of output signals each of which is related to a difference between time of arrival of a signal at said signal processing equipment at each end of said communication channel;

rejecting said output signals which have said difference between time of arrival outside of said signal time intervals; and employing said output signals which have said difference between time of arrival within one of said signal time intervals to monitor said nuclear reactor.

5. The method of claim 4 further comprising:

employing silicon carbide sensors as said radiation sensors.

6. The method of claim 4 further comprising:

employing a communication cable as said communication channel.

7. The method of claim 6 further comprising:

employing a radiation hard cable as said communication cable.

8. The method of claim 7 further comprising:

employing a quartz insulating material in said radiation hard cable.

9. The method of claim 4 further comprising:

employing a plurality of unique differences in time of arrival; and employing an acceptance window about each of the unique differences to form the signal time intervals.

10. The method of claim 4 further comprising:

producing said output signals having an amplitude proportional to said difference between time of arrival.

11. The method of claim 4 further comprising:

employing as said communication channel a cable having a first end and a second end;

receiving a first signal from said first end;

receiving a second signal from said second end; and providing a plurality of first lengths between said first end and said radiation sensors, and a plurality of second different lengths between said second end and said radiation sensors, in order to provide a unique predetermined difference in length between said first and second lengths for each of said radiation sensors.

12. The method of claim 11, further comprising:

employing as said radiation sensors at least a first radiation sensor, a second radiation sensor and a third radiation sensor; and employing a first length between said first end and said first radiation sensor, a second length between said first radiation sensor and said second radiation sensor, a third length between said second radiation sensor and said third radiation sensor, and a fourth length between said third radiation sensor and said second end.

13. The method of claim 12, further comprising:

employing equal first and fourth lengths.

14. The method of claim 12, further comprising:

employing equal second and third lengths.

15. The method of claim 14, further comprising:

classifying and counting events from said radiation sensors.

16. A system for monitoring radiation, said system comprising:

a communication channel having two ends;

a plurality of radiation sensors having spaced apart electrical connections to said communication channel;

signal processing equipment at each of the ends of said communication channel to process signals from said radiation sensors;

means for producing a plurality of output signals related to a difference between time of arrival of a signal at said signal processing equipment at each of the ends of said communication channel;

means for rejecting said output signals which have said difference between time of arrival outside of a predetermined signal time interval for each of said radiation sensors; and means for monitoring radiation based upon said output signals which have said difference between time of arrival within one of said predetermined signal time intervals.

17. The system of claim 16 wherein said means for producing includes timing analyzer means for measuring said difference between time of arrival.

18. The system of claim 16 wherein said means for monitoring radiation includes means for counting said output signals which have said difference between time of arrival within one of said predetermined signal time intervals; and means employing said counted signals for mapping neutron or gamma profiles.

19. The system of claim 16 wherein said output signals which have said difference between time of arrival outside of a predetermined signal time interval for each of said radiation sensors are noise signals which are rejected.

20. The system of claim 16 wherein said radiation sensors are adapted to sense radiation from at least one of: (i) spent nuclear fuel, and (ii) at least one nuclear fuel assembly.

21. The system of claim 16 wherein said radiation sensors are adapted to sense radiation from a plurality of nuclear fuel assemblies; wherein said nuclear fuel assemblies are disposed in a rack; and wherein said radiation sensors form a detector array which is outside said rack of said nuclear fuel assemblies.

22. The system of claim 16 wherein said radiation sensors are adapted to sense radiation from a plurality of nuclear fuel assemblies; wherein said nuclear fuel assemblies are disposed in a rack; and wherein said radiation sensors form a detector array which is inside said rack of said nuclear fuel assemblies.

23. The system of claim 16 wherein said radiation sensors are adapted to sense radiation from a nuclear reactor.

24. A method of rejecting noise and accepting signals from a communication channel, said method comprising the steps of:

providing a plurality of sensors having spaced apart electrical connections to said communication channel;

providing signal processing equipment at each end of said communication channel to process signals from said sensors;

establishing a difference in time of arrival for signals from each of said sensors to said signal processing equipment at each end of said communication channel;

establishing a signal time interval for each of said differences in time of arrival;

producing a plurality of output signals each of which is related to a difference between time of arrival of a signal at said signal processing equipment at each end of said communication channel;

rejecting said output signals which have said difference between time of arrival outside of said signal time intervals; and accepting said output signals which have said difference between time of arrival within one of said signal time intervals.

25. The method of claim 24 further comprising:

counting said output signals which have said difference between time of arrival within one of said signal time intervals.

26. The method of claim 24 further comprising:

employing a plurality of unique differences in time of arrival; and employing an acceptance window about each of the unique differences to form the signal time intervals.

* * * * *